(12) United States Patent
Van Winkle

(10) Patent No.: US 12,345,225 B2
(45) Date of Patent: Jul. 1, 2025

(54) REMOTE VEHICULAR INTERRUPTER

(71) Applicant: Jeremy Van Winkle, Lake Charles, LA (US)

(72) Inventor: Jeremy Van Winkle, Lake Charles, LA (US)

( * ) Notice: Subject to any disclaimer, the term of this patent is extended or adjusted under 35 U.S.C. 154(b) by 0 days.

(21) Appl. No.: 18/639,125

(22) Filed: Apr. 18, 2024

(65) Prior Publication Data
US 2024/0376853 A1 Nov. 14, 2024

Related U.S. Application Data

(63) Continuation of application No. 18/314,059, filed on May 8, 2023, now Pat. No. 11,988,182.

(51) Int. Cl.
| F02N 11/08 | (2006.01) |
| B60R 25/045 | (2013.01) |
| B60R 25/20 | (2013.01) |
| H04L 9/40 | (2022.01) |

(52) U.S. Cl.
CPC ........ *F02N 11/0807* (2013.01); *B60R 25/045* (2013.01); *B60R 25/209* (2013.01); *F02N 11/0862* (2013.01); *H04L 63/0435* (2013.01); *B60R 2325/108* (2013.01); *B60R 2325/205* (2013.01); *F02N 2300/306* (2013.01); *H04L 2463/121* (2013.01)

(58) Field of Classification Search
CPC ............. F02N 11/0807; F02N 11/0862; F02N 2300/306; B60R 25/045; B60R 25/209; B60R 2325/108; B60R 2325/205; H04L 63/0435; H04L 2463/121
USPC ......................................................... 701/113
See application file for complete search history.

(56) References Cited

U.S. PATENT DOCUMENTS

| 2013/0257591 | A1* | 10/2013 | Nishimura | ............. G05B 11/01 340/5.2 |
| 2017/0140641 | A1* | 5/2017 | Flick | ........................ B60R 25/24 |
| 2018/0345907 | A1* | 12/2018 | Tamane | ................ B60R 25/209 |
| 2020/0115931 | A1* | 4/2020 | Elbieh | ..................... E05B 85/06 |

FOREIGN PATENT DOCUMENTS

| DE | 102018131985 A1 * | 6/2019 | ......... B60R 16/0237 |
| RU | 174506 U1 * | 10/2017 | ............. B60R 25/33 |

OTHER PUBLICATIONS

RU-174506-U1 (Oct. 18, 2017) (Karipov et al.) (Machine Translation) (Year: 2017).*

* cited by examiner

Primary Examiner — Mahmoud Gimie
(74) Attorney, Agent, or Firm — Steven Rinehart

(57) ABSTRACT

A system and method of remotely interrupting the function of a vehicle using hardware components installed within a housing and a data processing device (DPD), such as a smart phone, in logical communication with one of the vehicle and the case via a WAN or LAN, wherein an ignition request is relayed via a network.

4 Claims, 13 Drawing Sheets

REMOTE VEHICULAR INTERRUPTER

BACKGROUND OF THE INVENTION

Field of the Invention

This invention relates to vehicular starting technologies and more particularly relates to a system and apparatus for interrupting and reenabling the starting of vehicles.

DESCRIPTION OF THE RELATED ART

Automobiles are typically powered by a lead battery or a lithium ion battery as known to those of skill in the art. Starting the engines in vehicles requires a starter which drains current from the battery, which starter is typically activated simply by turning a key. The battery is connected to the starter via the ignition switch inside the vehicle. The vehicle is disabled, or turned off, typically only by manually rotating a key, and there exists no efficient means in the art of disabling a vehicle remotely so that it cannot be started.

Rudimentary remotely-activated starters are known in the art, but these systems typically require a user keep in his possession a battery-powered key FOB with a range limited to a few dozen yards. These systems enable a vehicle to be started remotely from a limited range, but do not enable remote disabling of the starter. As increasingly numerous devices in users' lives interface with various radio-controlled devices, including garage doors, homes, cars, televisions, and even climate controls, the amount of radio controls which a user must maintain and keep in the user's possession compounds. It would be desirable in the art to have a means of starting and disabling a vehicle remotely from a distance not limited by the range of a typical radio-control such as a key FOB. It would desirable to have means in the art of disabling the starting of a plurality of vehicles remotely, such as a fleets of automobiles, boats, tractors, boats, motorhomes, motorcycles, electric bicycles, off-highway, vehicles, four-wheelers, tractors and equipment.

It is an object of the present invention is to provide a device which interfaces with specifically-engineered hardware components remotely to disable the starting of a plurality of vehicles from a single data-processing device, or to enable use and starting of the vehicle.

SUMMARY OF THE INVENTION

From the foregoing discussion, it should be apparent that a need exists for an integrated vehicular interrupter. Beneficially, such a system would overcome many of the difficulties of the prior art by providing a method of remotely interrupting function of a vehicle, the steps of the method comprising: combining a plurality of hardware components into a housing, the plurality of hardware components including an electromechanical relay and a wireless module having a universally unique identifier (UUID), and service wires; installing the housing within the vehicle such that the relay is installed in an electrical control circuit (ECU) controlling one of: a vehicle starter, a throttle, and vehicle spark plugs; initiating an ignition request using a mobile software application on a data processing device (DPD) in logical communication with the relay via a WAN, the ignition request comprising: a unique identifier exclusively associated with the vehicle, and one or more enabling timestamps and one or disabling timestamps; creating one or more encrypted ignition instructions consisting of less than all of the information contained in a corresponding ignition request; relaying each encrypted ignition instruction to a vehicle exclusively-associated with a single encrypted ignition instruction; storing all ignition requests and encrypted ignition instructions in persistent computer-readable memory; and energizing the relay in response to receiving an ignition request.

The relay may be one of: normally open and normally closed. The conductors forming the circuit may be physically cut and the relay is spliced into the circuit. The method may further comprise installing a plurality of housing within the vehicle, each housing in a different ECU.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
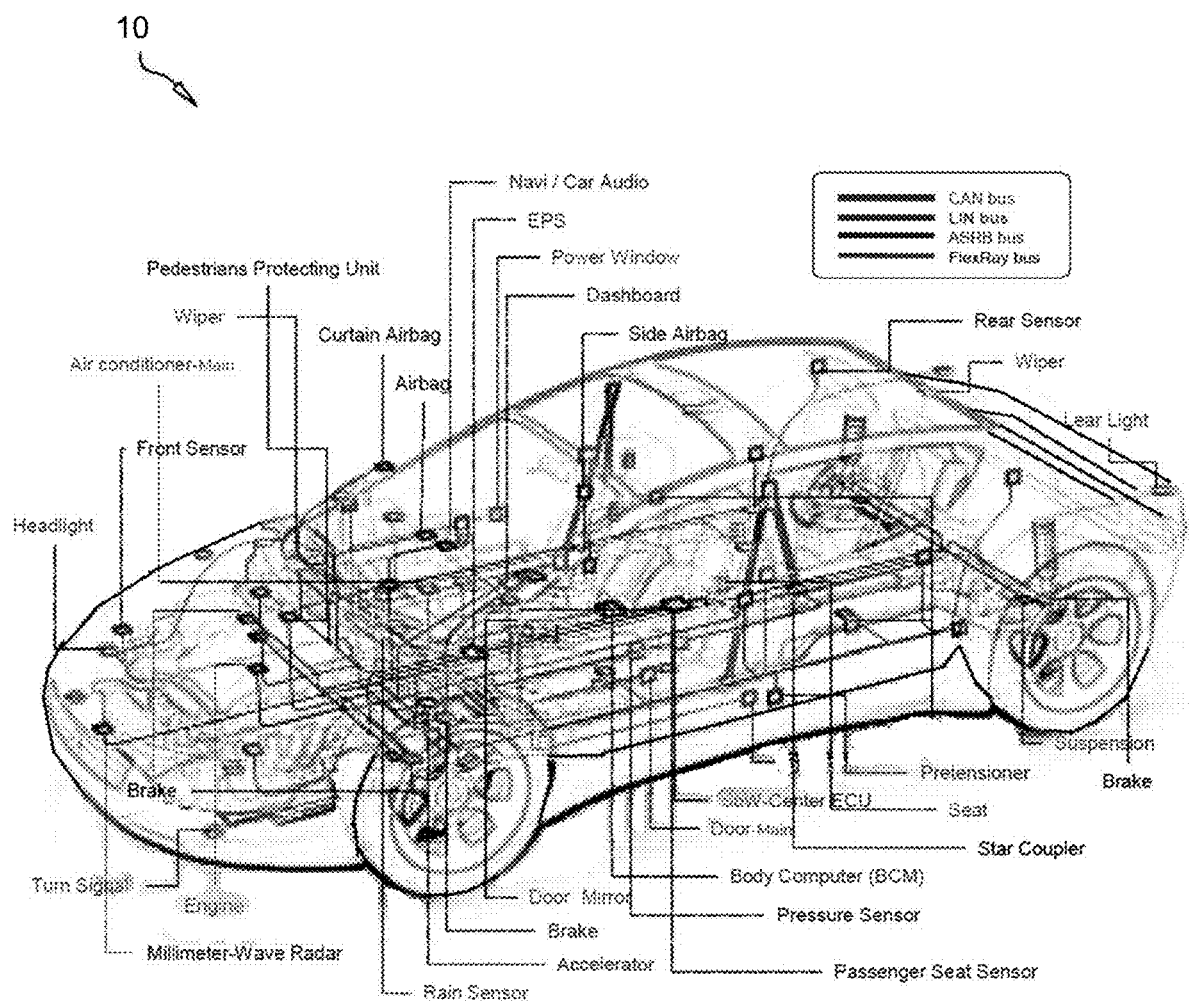
FIG. 1A is an environmental perspective view of a controller area network (CAN bus) in accordance with the prior art.

FIG. 1A is an environmental perspective view of a controller area network (CAN bus) 10 in accordance with the prior art.

A controller area network (CAN bus) is a vehicle bus standard designed to allow microcontrollers and devices to communicate with each other. It is a message-based protocol, designed originally for multiplex electrical wiring within automobiles to save on copper, but it can also be used in many other contexts. For each device, the data in a frame is transmitted serially but in such a way that if more than one device transmits at the same time, the highest priority device can continue while the others back off. Frames are received by all devices, including by the transmitting device.

The modern automobile may have as many as 70 electronic control units (ECUs) for various subsystems. Usually the biggest processor is the engine control unit. Others are used for autonomous driving, advanced driver assistance system (ADAS), transmission, airbags, antilock braking/ABS, cruise control, electric power steering, audio systems, power windows, doors, mirror adjustment, battery and recharging systems for hybrid/electric cars, etc. Some of these form independent subsystems, but communication among others is essential. A subsystem may need to control actuators or receive feedback from sensors. The CAN standard was devised to fill this need. One key advantage is that interconnection between different vehicle systems can allow a wide range of safety, economy and convenience features to be implemented using software alone-functionality which would add cost and complexity if such features were hard wired using traditional automotive electrics. Examples include:

Auto start/stop: Various sensor inputs from around the vehicle (speed sensors, steering angle, air conditioning on/off, engine temperature) are collated via the CAN bus to determine whether the engine can be shut down when stationary for improved fuel economy and emissions.

Electric park brakes: The hill hold functionality takes input from the vehicle's tilt sensor (also used by the burglar alarm) and the road speed sensors (also used by the ABS, engine control and traction control) via the CAN bus to determine if the vehicle is stopped on an incline. Similarly, inputs from seat belt sensors (part of the airbag controls) are fed from the CAN bus to determine if the seat belts are fastened, so that the parking brake will automatically release upon moving off.

Parking assist systems: when the driver engages reverse gear, the transmission control unit can send a signal via the CAN bus to activate both the parking sensor system and the door control module for the passenger side door mirror to tilt downward to show the position of the curb. The CAN bus also takes inputs from the rain sensor to trigger the rear windscreen wiper when reversing.

Auto lane assist/collision avoidance systems: The inputs from the parking sensors are also used by the CAN bus to feed outside proximity data to driver assist systems such as Lane Departure warning, and more recently, these signals travel through the CAN bus to actuate brake by wire in active collision avoidance systems.

Auto brake wiping: Input is taken from the rain sensor (used primarily for the automatic windscreen wipers) via the CAN bus to the ABS module to initiate an imperceptible application of the brakes while driving to clear moisture from the brake rotors. Some high-performance Audi and BMW models incorporate this feature.

Sensors can be placed at the most suitable place, and their data used by several ECUs. For example, outdoor temperature sensors (convention placed in the front) can be placed in the outside mirrors, avoiding heating by the engine, and data used by the engine, the climate control, and the driver display.

In recent years, the LIN bus (Local Interconnect Network) standard has been introduced to complement CAN for non-critical subsystems such as air-conditioning and infotainment, where data transmission speed and reliability are less critical.

Figure 1B:
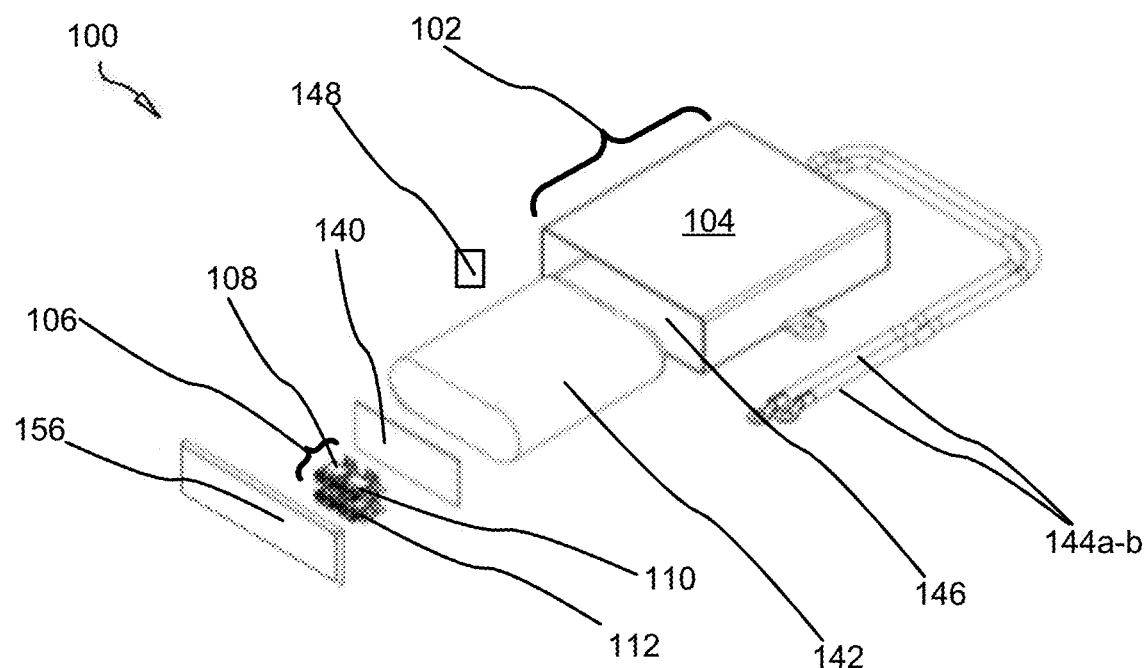
FIG. 1B is an exploded isometric view of an apparatus and system of remotely disabling and reenabling the starting of a vehicle in accordance with the present invention.

FIG. 1B is an exploded isometric view of an apparatus and system of remotely disabling and reenabling the starting of a vehicle 100 in accordance with the present invention.

The apparatus 100 comprises a housing 104 which may receive a power supply such as a lithium-based battery 142. The battery 142 may comprise a plurality of cells connected in series, or in parallel, within the housing 102, such that battery may power the device/apparatus 100 when the vehicle 304 is switched off. The housing 104 may be ovoid, cubic, rectangular, or square. In some embodiments, the housing 104 affixes within a steering column of the vehicle 304 and may be adapted to affix over the keyhole of the vehicle 304.

In various embodiments, the housing 104 comprises an open forward end 146 through which the cells 142 are inserted into the housing 104. A forward plate 140 may dispose over the open forward end 146. The forward plate 142 may slide into a track defined on, or by, the open forward end 146.

The faceplate 146 positions over the forward plate 140.

The apparatus 100 may also comprise one or more PCB boards 108 adapted to impart remote control over the switch 108 from a remote data-processing device (DPD) such as a smart phone in logical connectivity with the apparatus 100 via cellular network or WAN.

In accordance with embodiments of the invention, a system of remotely tracking and controlling vehicles 100 is provided. The system 100 includes a vehicle control module 102 operable to control an ignition system of a vehicle 101. The vehicle control module 102 includes a waterproof case 104, such as an injection molded case, operable to protect internal components of the vehicle control module 102. A printed circuit board 106 is contained within the vehicle control module 102. A microprocessor 108 is disposed on the printed circuit board 106.

A wireless module 110, such as a Bluetooth® module, may be disposed on the printed circuit board 106.

The apparati 100-300 may comprise means for relaying and receiving electrical signals enabling device-to-device communication between the DPD 111 and the module 102. The module 102 may be configured to make use of the Bluetooth® protocols and procedures enabling device-to-device intercommunication connectivity in lieu of making use of a WAN. This functionality may be provided by incorporating the Bluetooth Intercom Profile® and/or the Bluetooth Telephony Profile®, or other wireless technologies known to those of skill in the art.

This communication may be in accordance with core specifications of one or more subsets of Bluetooth® profiles, wherein the core specifications comprise one or more of: the Cordless Telephony Profile (CTP), the Device ID Profile (DIP), the Dial-up Networking Profile (DUN), the File Transfer Profile (FTP), the Hands-Free Profile (HFP), the Human Interface Device Profile (HID), the Headset Profile (HSP), and the Intercom Profile (ICP), the Proximity Profile (PXP).

The secondary cables 144*a-b* (or service cables) are adapted to be semi-permanently affixed to the internal battery 122 within the housing 104. In a default position, the switch 148 is spring-biased to return to a default position in which current to the power systems of the automobile 304 is disabled. The switch 148 may comprise a four-way switch or logic within the PCB enabling only virtual activation of the switch. When the switch is activated to an "on" position, operation and starting of the vehicle using standard means, such as a key are possible.

The apparatus 100 may be positioned in, spliced in, inserted into, or otherwise incorporated into the ignition system wiring, the ignition relays, and the starter solenoid, and/or starter motor or electric motor of an electric vehicle.

Figure 2:
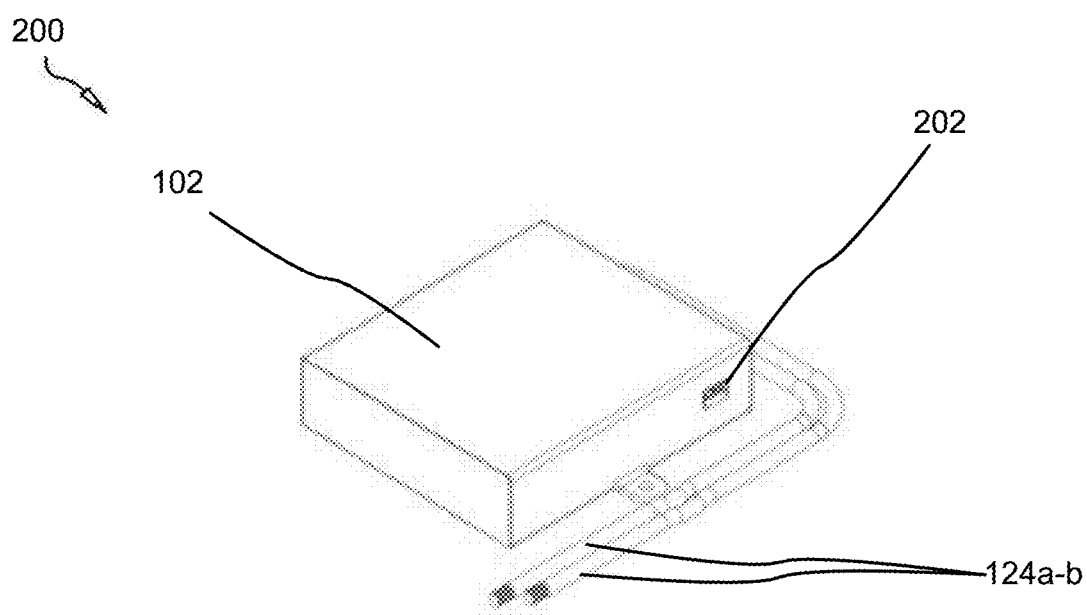
FIG. 2 is an isometric view of an apparatus and system of remotely disabling and reenabling the starting of a vehicle in accordance with the present invention.

FIG. 2 is an isometric view of an apparatus and system of remotely disabling and reenabling the starting of a vehicle 200 in accordance with the present invention.

The apparatus 100 may comprise a faceplate 126, which may have a plurality of controls, including a USB port for enabling direct interface with the apparatus 100, 200. The faceplate 146 may comprise a plurality of ports 202 for directing power to devices external to the apparatus 200, including, in some embodiments, USB ports as shown.

Figure 3:
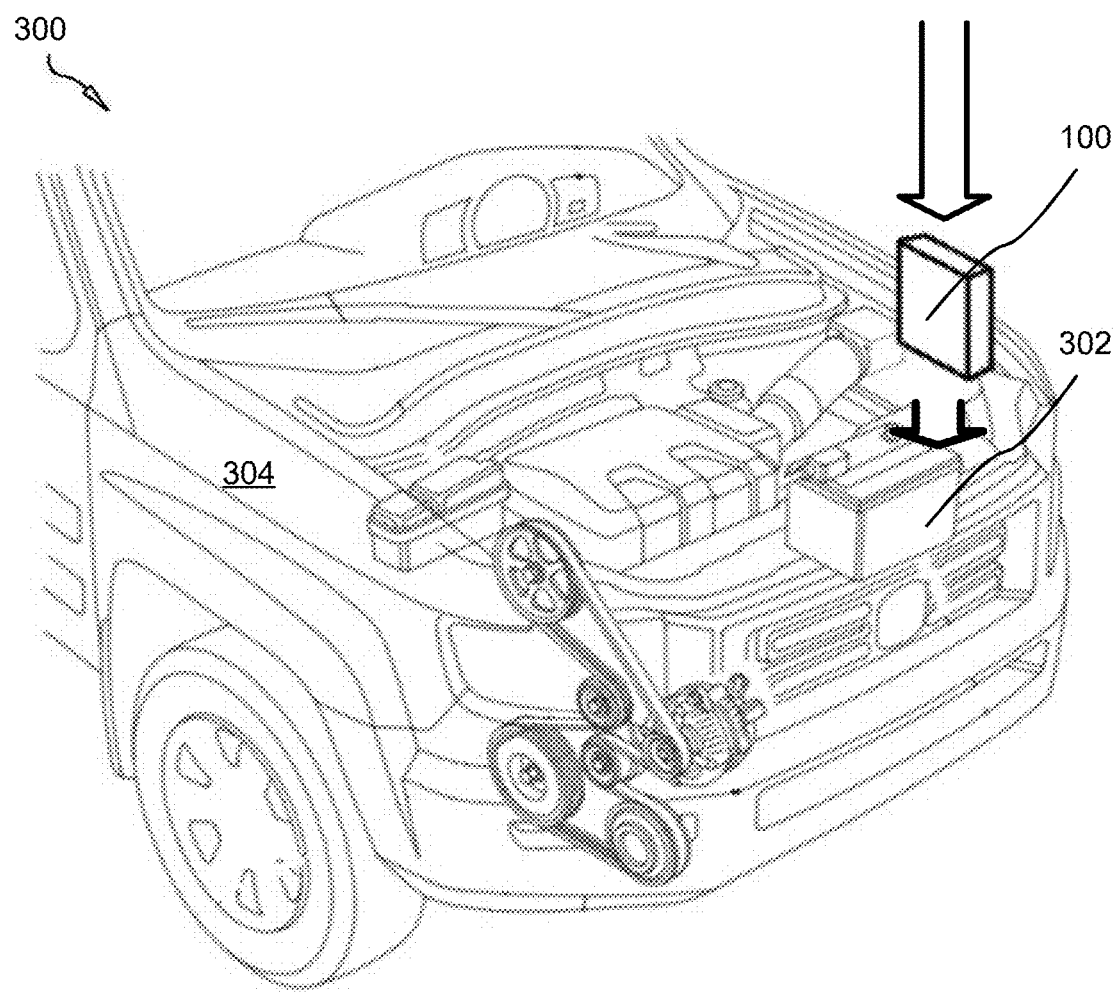
FIG. 3 is an environmental view of an apparatus and system of remotely disabling and reenabling the starting of a vehicle in accordance with the present invention.

FIG. 3 is an environmental view of an apparatus and system of remotely disabling and reenabling the starting of a vehicle in accordance with the present invention.

In various embodiments, the apparatus 100 positions at any installation point in the engine compartment, dashboard, steering column, or elsewhere where the device 100 may be spliced into a circuit whose completion enables operation of the power train of the vehicle 304.

Figure 4A:
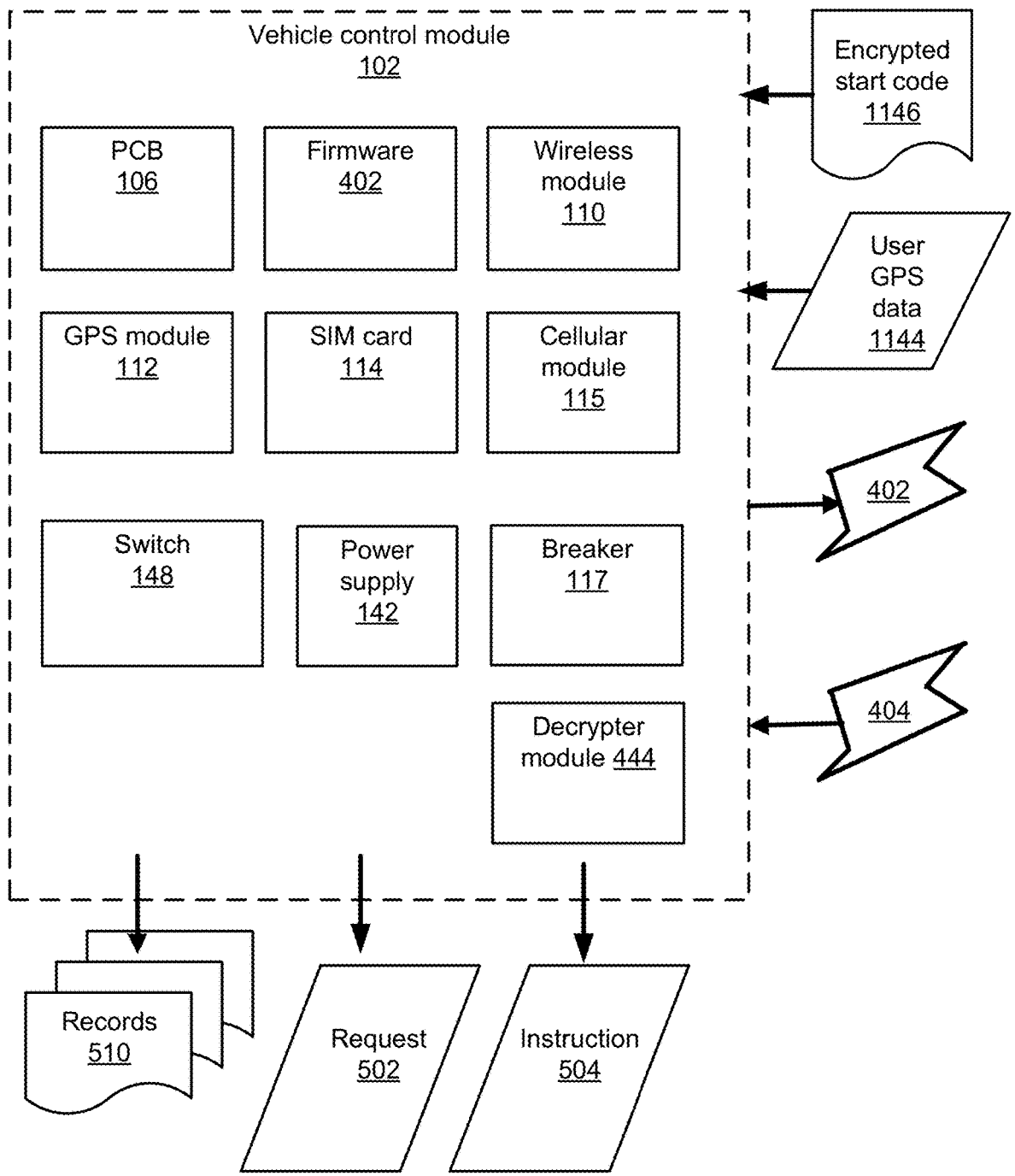
FIG. 4A is a block diagram illustrating one embodiment of a system for remotely disabling and reenabling the starting of a vehicle in accordance with the present invention.
Figure 4B:
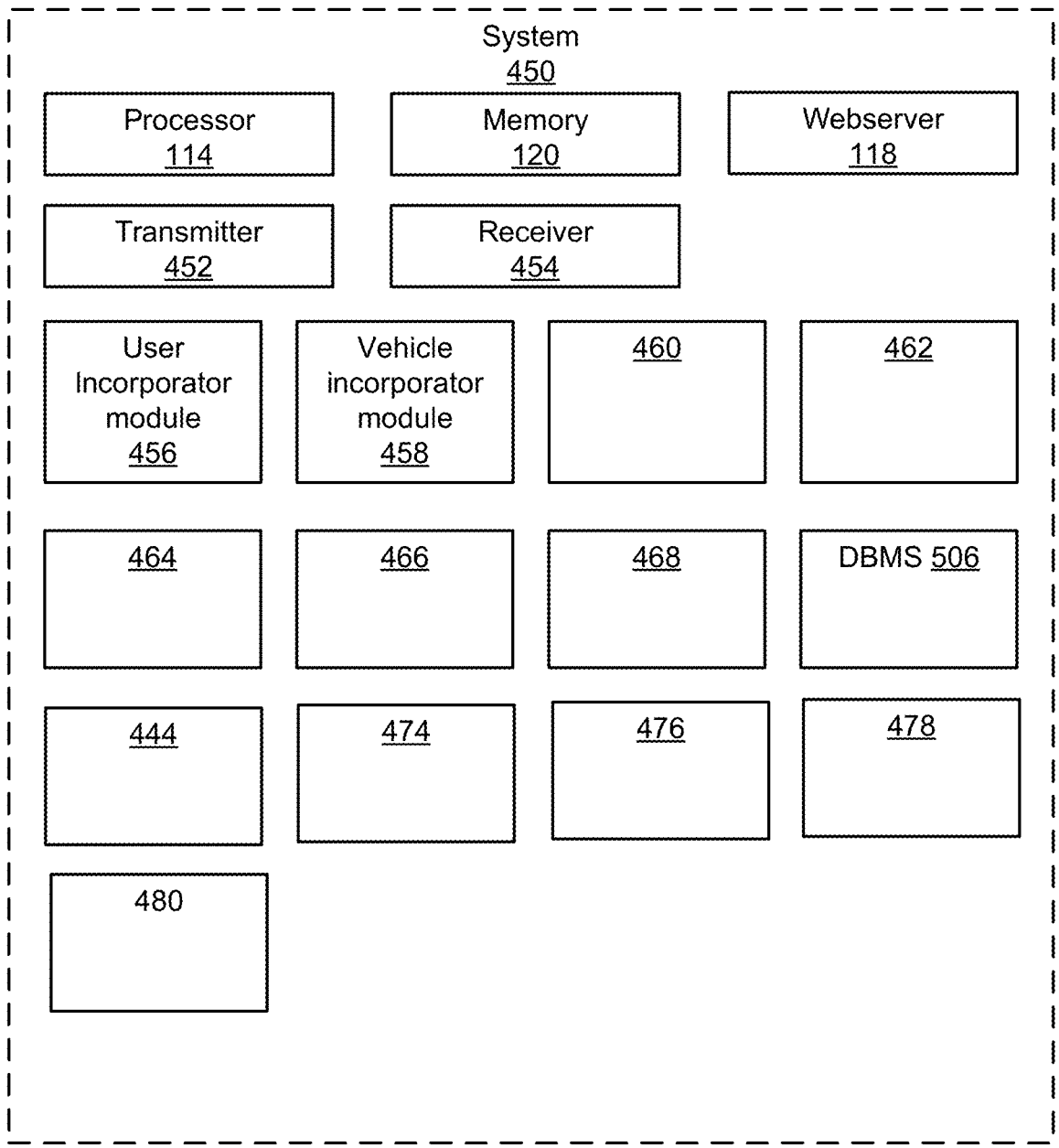
FIG. 4B is a block diagram illustrating one embodiment of a system for remotely disabling and reenabling the starting of a vehicle in accordance with the present invention.

FIGS. 4A-4B illustrate block diagrams illustrating embodiments of a system for controlling and tracking vehicles in accordance with the present invention.

The system 400 includes a centralized data processing server 118. A cloud database 120 is hosted on the centralized data processing server. The cloud database 120 hosted on the centralized data processing server 118 may include username, passwords, user contact information, vehicle identification number, and can be used to remote look up vehicle location via GPS or provide service to user reported problems. The system 100 includes a mobile software application 122 operable to communicate with the centralized data processing server 118.

The mobile software application 122 is operable to unlock upon verification an identity of a user through password or biometrics, such as fingerprints or facial recognition, for example. The mobile software application 122 is operable to wirelessly control the vehicle control module 102 to control an ignition system of a vehicle via a wireless connection between the wireless module 110 and a wireless module of mobile computing device.

The wireless module 110 is operable to communicate wirelessly with a mobile computing device, such as a smart phone 111. The wireless module 110 may include a universally unique identifier (UUID).

A GPS module 112 may be disposed on the printed circuit board 106. A SIM card 114 is disposed on the printed circuit board 106. A cellular module 115 may be disposed on the printed circuit board 106. The cellular module 115 and the SIM card 114 are operable to communicate a signal of the location of the GPS module 112 through a wireless telephone carrier network. A wiring harness 116 is operable to connect the printed circuit board 106 to a vehicle ignition system. For example, the wiring harness 116 includes CAN bus communication protocol, with wiring, plugs, and adapters to connect directly and communicate directly to vehicle ECU. An automatic breaker 117, such as a 20-amp breaker or higher, may be included in the vehicle control module 102.

The system 450 comprises a user incorporation module 456.

The user and manager 512 may comprise any person, company, or organization that is an owner or controller of a plurality of vehicles, tractors, boats or other machines, including electric vehicles and machines, including electrical bicycles, scooters, aircraft. Each user and/or manager 512 are incorporated into a management network comprising vehicles and users who have registered with the server 118. For the purposes of this patent, the terms "incorporate" and "incorporation" denote the act of formally enrolling a vehicle 304 and a user or manager 512 into the management network.

Managers 512 become incorporated when they create accounts with the server 118 by uploading personal identifying information, including one or more of: an address, a VIN of a vehicle, an email address, a telephone number, definition of purchasing practices, and the like. In typical embodiments, the registration takes place via a browser, but may also be sent to the server 118 using programs well-known to those of skill in the art, such as Microsoft Outlook, Thunderbird, Yahoo! Mail, and the like. In other embodiments, the users and/or managers 512 are incorporated by receiving personal information via an API from a social media provider such as Google®, Facebook® Twitter®, Instagram®, Snapchat®, or other social media providers known to those of skill in the art.

The user incorporation module 456 is configured to incorporate the user or manager 512, who then incorporates the vehicle 304 using the vehicle incorporator module 458 which is configured to create unique identifiers in memory 120 exclusively associated with the vehicle 304, which identifiers may be encrypted.

In various embodiments, the module 102 includes GPS components to facilitate tracking of the vehicle 304. The device 100 may comprise motion sensors for detecting motion of the vehicle 304 and then relaying alerts to the server 118 or DPD 111. These motion sensors may be adapted to detect crashes, airbag deployments, and the like.

The system 450 includes a transmitter 452 for transmitting a wireless signal as well as receiver or transceiver 454 for receiving a wireless signal. In various other embodiments, the module 450 may comprise a geofencing module 460 adapted to disable the vehicle 304 in response to the vehicle traveling outside a predetermined geographic area or map, an alert module 462 adapted to send alerts to the technology provider and server 118 via the WAN or Bluetooth when a motion detector is triggered, a clock 464 for maintaining track of predetermined periods of time and cross referencing timestamps, an alarm module 466 for emitting a high frequency pitched sound in response to receiving an SOS alter from the DPD 111 or server 118, an appointment module 468 for receiving the locations service providers and scheduling appointments, and a decrypter module 444 for decrypting instructions 504 received from the user using various protocols such as BLE standard, manager 512 or server 118.

The mobile phone application 122 may be coded in C #, .NET or .NET 7, and may make use of SQL, mySQL, Oracle or other databases and RDBMSs 506. The mobile phone application include biometric recognition functions on the DPD 111 using means known to those of skill in the art, including fingerprint, facial recognition, retina scan, and the like.

Figure 4C:
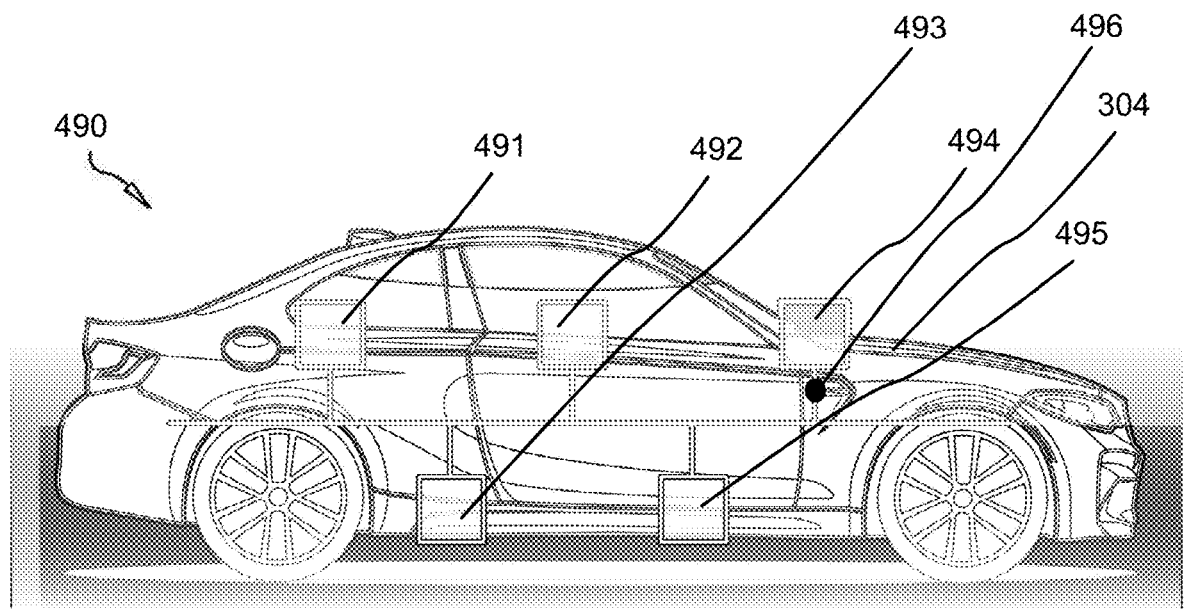
FIG. 4C is an environmental, entity relationship diagram illustrating one embodiment of a system for remotely disabling and reenabling the starting of a vehicle in accordance with the present invention.

FIG. 4C is an environmental, entity relationship diagram illustrating one embodiment of a controller area network bus 490 in accordance with the present invention.

The controller area network (CAN) 490 having multiple electronic control units (ECUs) 491-495 for various subsystems, including the ignition. The vehicle 304 may be electric or fuel combustion.

In various embodiments, the ECU indicated at 491 controls the rear motors, the ECU indicated at 493 controls the power doors, the ECU indicated at 494 controls the spark and fuel injection functions to the engine, while the ECU indicated at 495 controls the starter.

As shown, a relay is physically installed within the CAN 490. In this the shown embodiment, the relay 496 comprises a switch and hardware operable to connect the relay via Bluetooth, or using other wireless protocols, to a remote DPD. The DPD is operable, via the Bluetooth connection, to enable and disable the relay/switch 496 and close the circuit including the spark and fuel injection functions. Alternatively, the relay 496 may be including in alternate or additional ECUs 491-495. The relay 496 is physically installed within the ECU on electrical connections wiring said to, or into, the CAN bus 490, nodes of the CAN 490, a LIN bus, and the like.

Figure 4D:
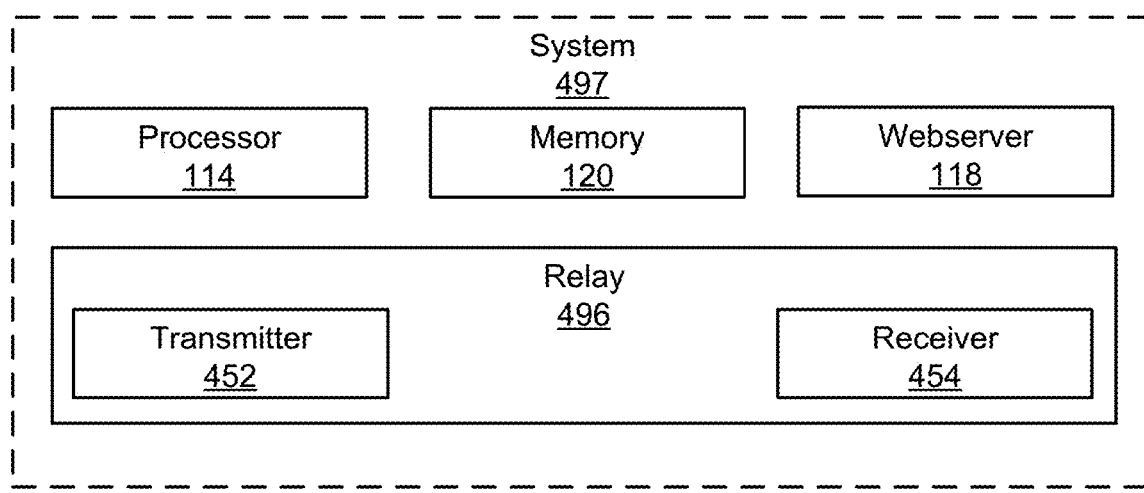
FIG. 4D is a block diagram illustrating one embodiment of a system for remotely disabling and reenabling the starting of a vehicle in accordance with the present invention.

FIG. 4D is a block diagram illustrating one embodiment of a system 497 for remotely disabling and reenabling the starting of a vehicle in accordance with the present invention.

The relay 496 may comprise the transmitter 452 and receiver 454 necessary to bring the relay into connectivity on a LAN or WAN with a DPD under the control of a user. In various embodiments, this user may program the relay 496 to switch on or off at a predetermined interval. By way of example, the relay 496 may be programmed to switch off after 24 hours, disabling the ECU 494 and the ignition of the vehicle. Alternatively, the relay 496 may be programmed to switch on or off in response to certain provoking events, such as a sequence of on or off commands sent to a CPU or CAN controller. The relay 496 may comprise the firmware, memory, and/or chipsets necessary to enable remote programmable function by a DPD.

In some embodiments, a sequence of commands may be sent manually using dashboard controls to a vehicle control module, such as ignition on-off commands, power door locks, throttle, or climate control activations. The vehicle control module may check the sequence in which these commands are sent and cross-reference, or authenticate them, using an encrypted or non-encrypted hash table or data structure in computer readable memory.

In some embodiments, including electric vehicles, the relay 496 is installed on a throttle or accelerator ECU to disable use of the vehicle 304.

Figure 5A:
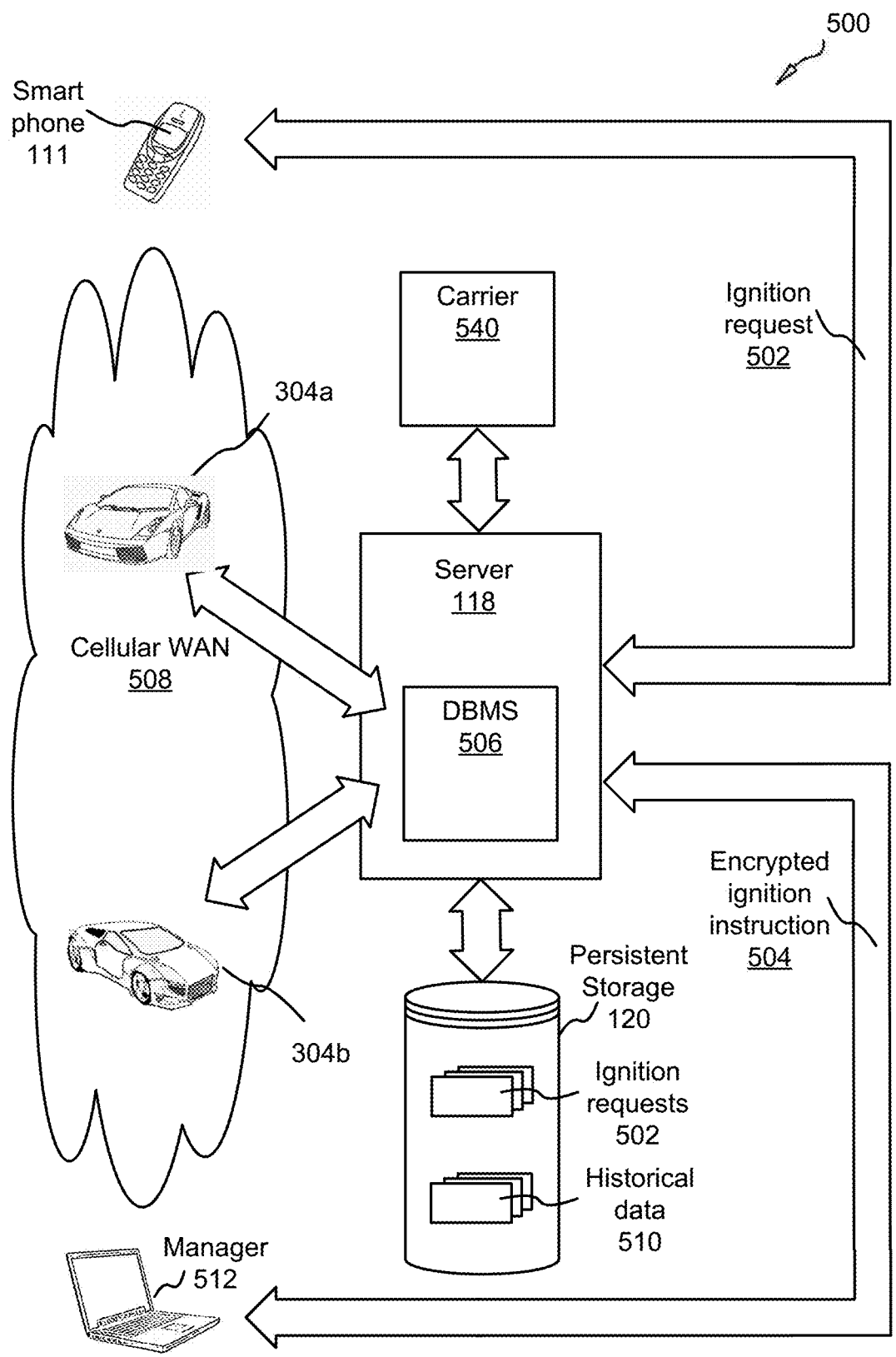
FIG. 5A is a data entity flow diagram illustrating one embodiment of a system for remotely disabling and reenabling the starting of a vehicle in accordance with the present invention.

FIG. 5A is a data entity flow diagram illustrating one embodiment of a system for controlling and tracking vehicles 500 in accordance with the present invention. Other leveraged programs and coding schemes may include Apple Xcode 14, JAVA, HTML and CSS.

In various embodiments, a user controlling a smart phone 111 initiates an ignition request 502 through a mobile software application 122 comprising a set of computer-readable instructions stored in persistent computer-readable memory on the phone 111.

This ignition request 502 may be encrypted using means known to those of skill in the art, and may comprise a computer-readable file stores in database memory which is uploaded via a WAN 508 such as a cellular network having a service area in which the phone 111 may be found.

The system 500 comprises a server 118, a database management system (DBMS) 506, persistent storage 120, stored ignition requests 502, and stored historical data 510.

Typically, the server 118 comprises one or more central processing units executing software and/or firmware to control and manage the other components within the system 500. In one embodiment, the server 118 comprises hardware and/or software more commonly referred to as a Multiple Virtual Storage (MVS), OS/390, zSeries/Operating System (z/OS), UNIX, Linux, or Windows system.

The server may comprise a server cluster with firewalls, load balancer, and database servers having Apache® and/or other software applications well-known to those of skill in the art. The server 118, in the shown embodiment, comprises a database management system (DBMS) 506 or relational database management system (RDBMS), such as Oracle, MySQL, SQL, FireBird, IBM DB2®, or the like.

The server 118 is in logical communication with one or more phone 111 and/or one or more managers 512 through a networked environment 508, such as local area network (LAN) or wide area network (WAN). The server 118 may communicate with phones 111 and/or managers 512, sending queues, ignition requests 502, and encrypted ignition instructions 504 using variations of the Simple Mail Transfer Protocol (SMTP), Internet Message Access Protocol (IMAP), BlueTooth, Post Office Protocol (POP), or other protocols well-known to those of skill in the art.

The manager 512 may comprise a smartphone or any DPD which, internally or externally, can communicate with the server 118.

In the present invention, the server 118 routes information between phones 111 and the manager 512.

In the present invention, as further described in detail above and below, users create ignition requests 11 on their phones 111 which are then relayed to the server 118. In alternative embodiments, the ignition requests 502 are created by the managers 512.

As shown, in various embodiments, a plurality of vehicles 304*a*-*b*, having vehicle control modules 102, are in logical communication with server 118.

These ignition requests 502 may comprise information about the vehicle 304 to be activated, including a Boolean indicating as true when a specified vehicle 304 is intended to enabled (or started) or disabled, a unique identifier exclusively associated with either the vehicle 304 or the vehicle control module 102 installed on the vehicle 304, a first timestamp indicating a time when the vehicle 304 will be activated and a second timestamp indicated when the vehicle 304 will be disabled. The various embodiments, the ignition request 502 comprises a plurality of unique identifiers exclusively associated with different vehicles 304*a*-*b* within a fleet or under the common control of a manager 512.

The ignition request 502 may be parsed into a plurality of encrypted ignition instructions 504, each ignition instruction relayed via the WAN 508 to a single vehicle 304. The vehicles' 304 vehicle control modules 102 may be adapted to start a vehicle 304 at a time indicated by the first timestamp and disable the vehicle at a time indicated by the second timestamp.

In some embodiments, the server 118 collects payment from a user before relaying an encrypted ignition instruction 504 to a vehicle 304 in accordance with a predetermined payment schedule mutually agreed upon by the user or a manager 512 and one or more of: an organization managing the server 118 and mobile software application 122.

In various embodiments, the WAN 508 is administered and under the control of a carrier 540.

The encrypted ignition instruction 504 may contain all of the information in the ignition request 502 which is exclusively associated with a single vehicle 304.

Figure 5B:
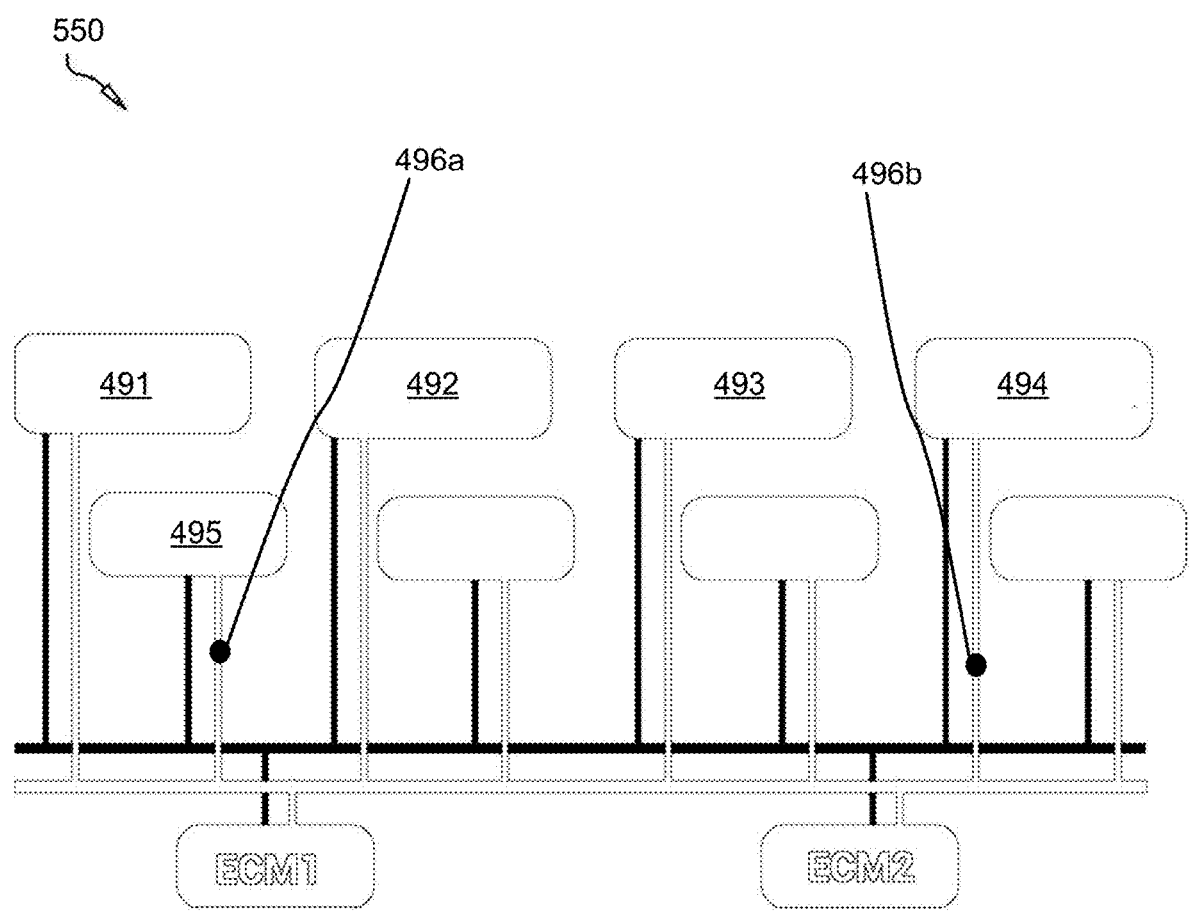
FIG. 5B is a data entity flow diagram illustrating one embodiment of a system for remotely disabling and reenabling the starting of a vehicle in accordance with the present invention.

FIG. 5B is a data entity flow diagram illustrating one embodiment of a system 550 for remotely disabling and reenabling the starting of a vehicle in accordance with the present invention.

The relay 496*a* is physically connected in the shown embodiment to ECU 495 to control the starter. When the relay 496 is disabled remotely, the vehicle 304 cannot be started. A second relay 496*b* is also installed in the circuit 494 controlling spark and fuel injection.

Figure 6:
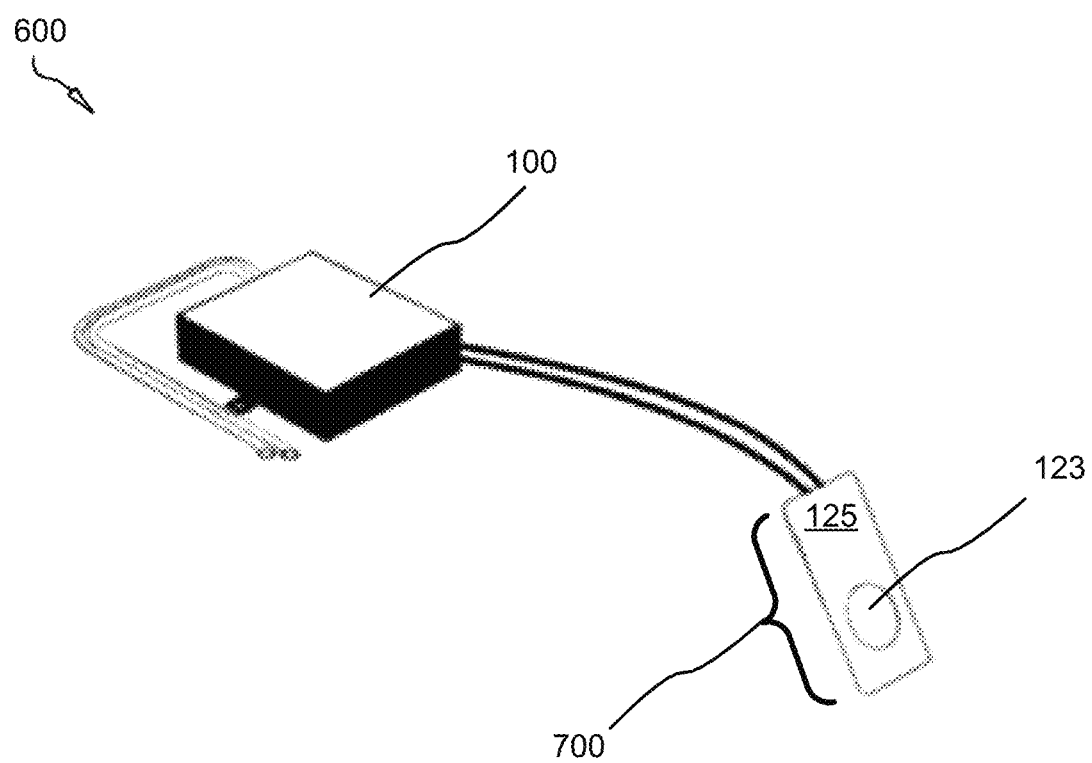
FIG. 6 is an isometric view of an apparatus and system of remotely disabling and reenabling the starting of a vehicle in accordance with the present invention.

FIG. 6 is an isometric view of an apparatus and system of remotely tracking and controlling vehicles in accordance with the present invention.

In various embodiments, the apparatus/system 100 is in logical communication with a graphical user interface 700.

Figure 7:
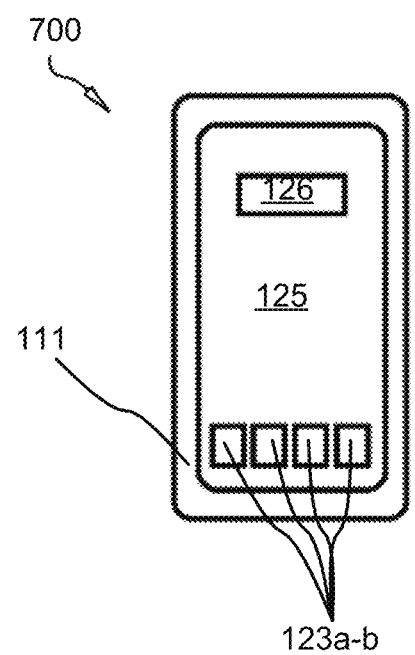
FIG. 7 is a graphical user interface of a mobile application of a system and method of remotely disabling and reenabling the starting of a vehicle on a smart phone in accordance with the present invention.

FIG. 7 is a graphical user interface of a mobile application of a system and method of remotely tracking and controlling vehicles on a smart phone in accordance with the present invention.

The mobile software application 122 is operable to display the location of the GPS module 112 that has been communicated from the vehicle control module 102. If a vehicle equipped with the vehicle control module 102 is outside of the range of a short field wireless connection between a mobile computing device and the wireless module 110, the mobile software application 122 is operable to control the vehicle control module 102 through the cellular module 115. The mobile software application 122 may be operable for Apple iOS and Google Android systems, for example.

Various buttons 123 and informational displays can be programmed into a graphical user interface 125 of the mobile software application 122, such as an unlock button 126 which can be triggered by facial recognition, pin code, or thumb print, a GPS location and map, login, and account setup. The mobile software application 122 may be operable for multiple users and multiple vehicles, such as a family that owns multiple cars or fleet rentals. A time out feature may be included to allow users to close the circuit for a period of time. For example, a user has the ability to start a vehicle open allowing the vehicle to turn on and off during this process. Once the time expires, the user will be required to once again authenticate through the application via facial recognition, thumb print, or pin ID to start the vehicle.

In an exemplary operation, once the vehicle control module 102 is wired into an ignition, a user will create an account using the mobile software application 122 and connect to the vehicle control module 102 via a Bluetooth connection and a specific unique ID code and/or through CAN bus communication protocol to allow only one account to be associated with the vehicle control module 102. Once paired, the ignition key can be placed into an on position. The user will then login into the mobile software application 122 and select vehicle. Once the vehicle is selected the user, can hit the unlock button to unlock mobile software application 122. An unlock sequence will begin with facial recognition, thumbprint scan, or a pin code. Once unlocked, the mobile software application 122 will send communication through a Bluetooth connection to the wireless module 110 and the microprocessor 108 will send communication to allow the ignition circuit to be used, thereby starting the vehicle.

Figure 8:
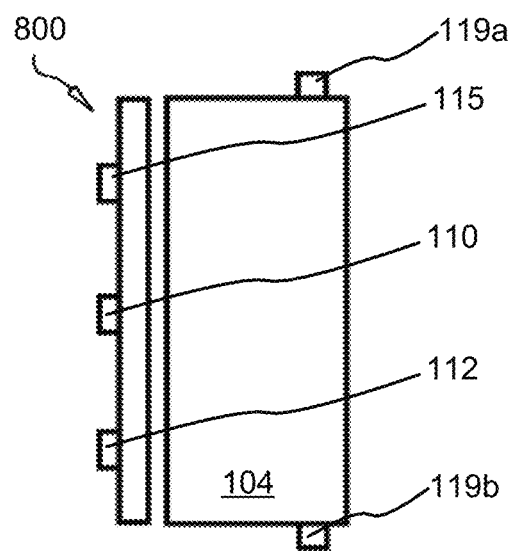
FIG. 8 depicts a vehicle control module of a system and method of remotely disabling and reenabling the starting of a vehicle in accordance with embodiments of the present invention.

FIG. 8 depicts a vehicle control module of a system and method of remotely tracking and controlling vehicles in accordance with embodiments of the present invention.

A pigtail connection 119 may be used to wire the vehicle control module 102 into a vehicle. The pigtail connection 119 includes 4 wires-hot, ground, ignition in 404, and ignition out 402. In one embodiment, the vehicle control module 102 includes functionality operable to serve as a key fob, which is frequently required to be detected by a vehicle as a condition to start the ignition.

Figure 9:
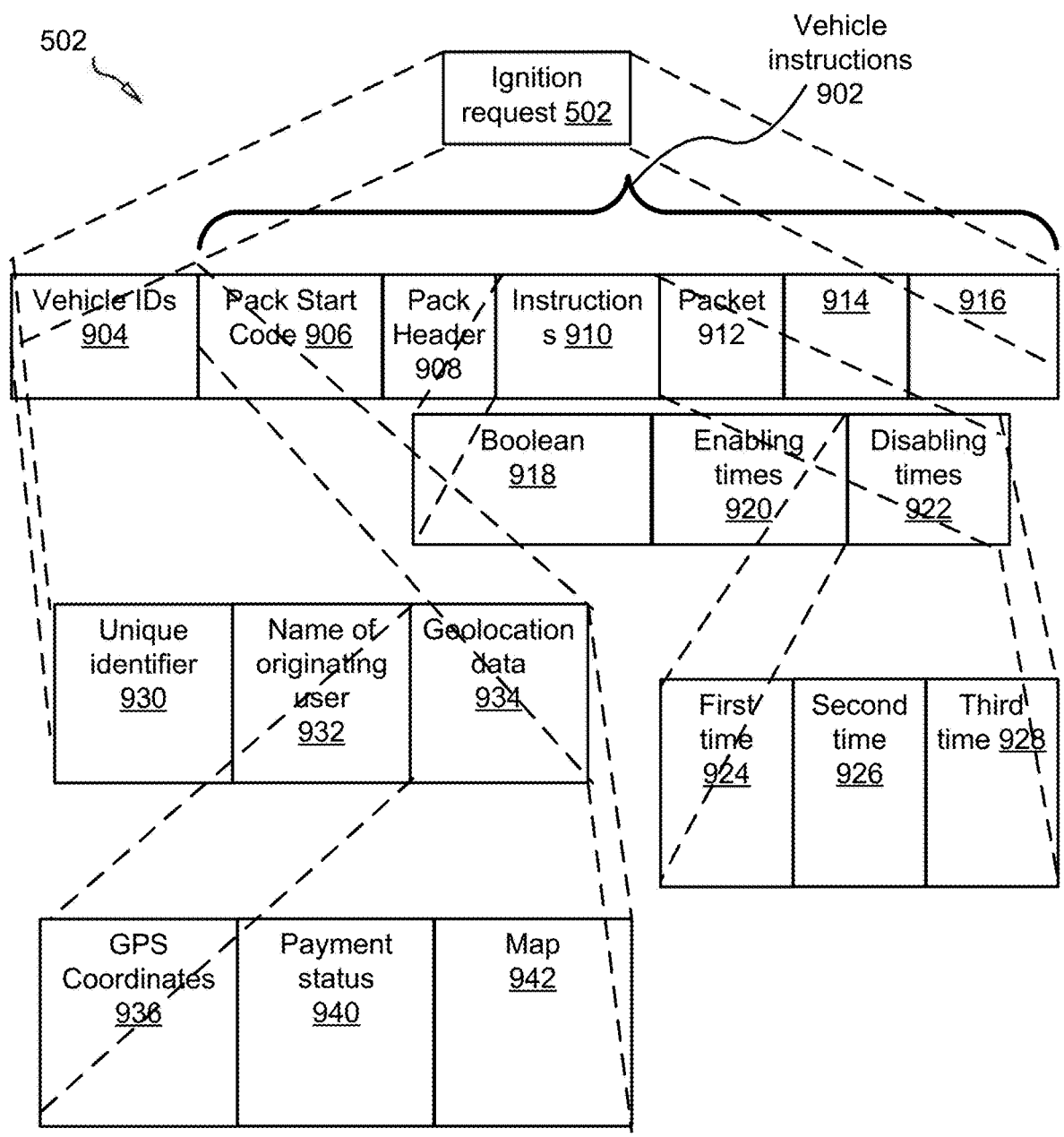
FIG. 9 illustrates a data layout diagram of an ignition request of a system and method of remotely disabling and reenabling the starting of a vehicle in accordance with embodiments of the present invention.

FIG. 9 illustrates a data layout diagram of an ignition request 502 of a system and method of remotely tracking and controlling vehicles in accordance with embodiments of the present invention.

The ignition request 502 comprises one or more packets 904 of vehicle identifying information. This packet 904 may comprise a unique identifier 930 exclusively associated with a vehicle, the name of a user 932 controlling a DPD 111, and geolocation data 934 of the phone 111 and/or the vehicle 304, including GPS coordinates 932, and a map 942 defining a predetermined geographic area within which use of the vehicle 304 is authorized. Should the vehicle 304 exit the geographic area defined by the map 942, the module 102 is adapted to automatically disable the vehicle 304. In this manner, the vehicle 304 is geofenced within a predetermined geographic area. The ignition request 502 may comprise a plurality of packets 904 which are parsed by the server 118 into smaller encrypted instructions 504 relayed to individual vehicles 304.

The ignition request 502 may comprise packet headers 908 and packet codes 914, 916, including HTML instructions. Each ignition request 502 comprises instructions 910, which is a packet or list of information containing instructions about when to activate, start or disable a vehicle 304, including a Boolean expressing as true or false indicating a start command for the vehicle and one or enabling times 920 indicated times of day (or a date and time) when the vehicle 304 may be started as well as one or more disabling times indicated a time of day 924, 926, 928 (or a date and time) when the vehicle 304 should be disabled. In various embodiments, a timeframe may be relayed to the vehicle 304 specifying a predetermined period of time within which the starter of the vehicle 304 should be disabled, such as 48 hours, ten days, and the like. All ignition requests 502 are stored as historical data in persistent storage 120 by the server 118.

Figure 10:
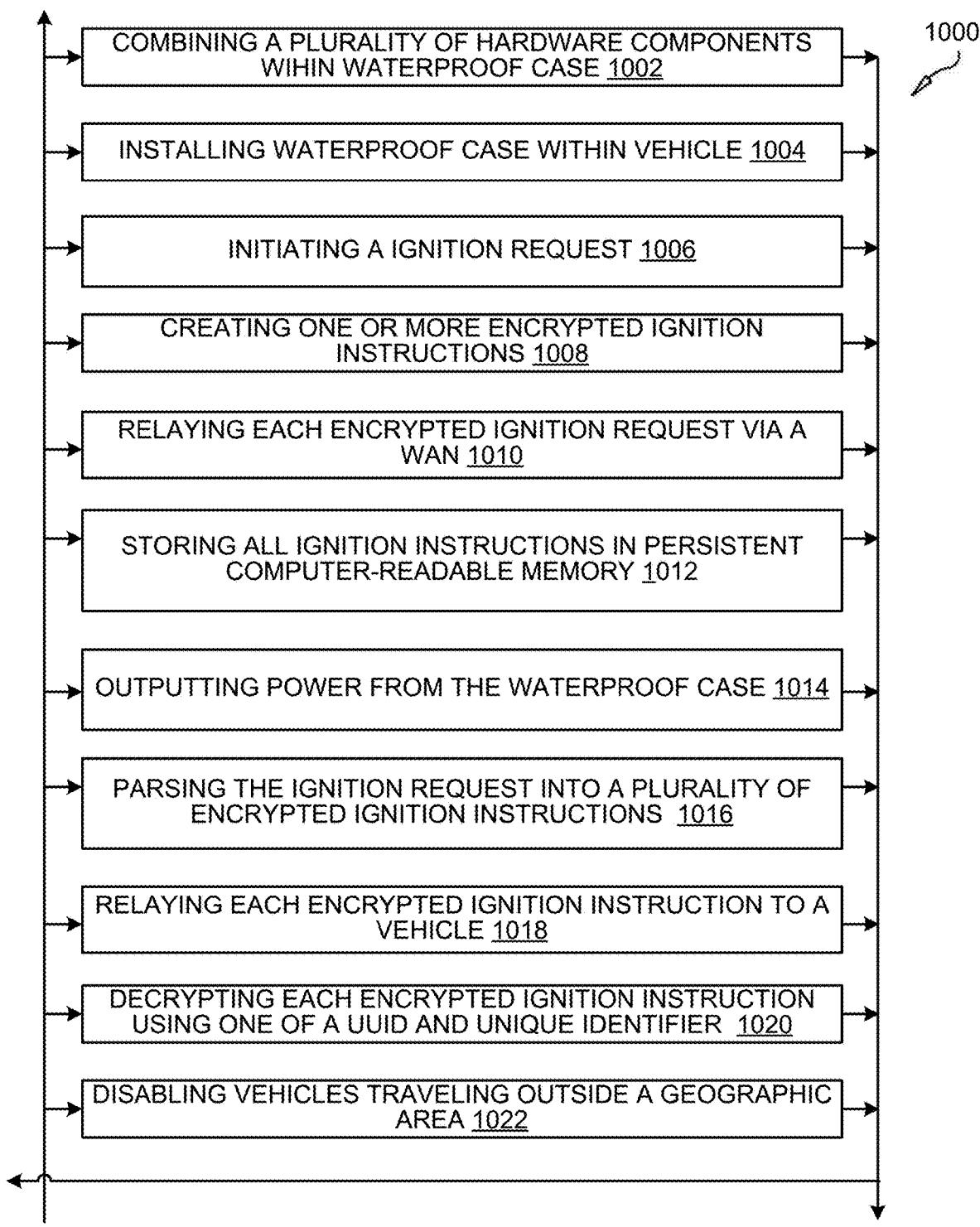
FIG. 10 illustrates the steps of a method 1000 of remotely disabling and reenabling the starting of a vehicle in accordance with embodiments of the present invention.

FIG. 10 illustrates the steps of a method 1000 of remotely tracking and controlling vehicles in accordance with embodiments of the present invention.

The method 100 comprises a step of combining 1002 a plurality of hardware components into a waterproof case (i.e., housing) the plurality of hardware components including a battery, a switch, a PCB, a wireless module having a universally unique identifier (UUID), service wires, and a GPS module.

The waterproof case 102 is installed 1004 within the vehicle within the electrical circuit providing power to operate said vehicle. A DPD 111, operated by a user, initiates 1006 an ignition request 502 using a mobile software application on a data processing device (DPD) 111 in logical communication with the hardware components via a WAN, the ignition request 502 comprising: a unique identifier exclusively associated with the vehicle 304, one or more enabling timestamps 902 and one or disabling timestamps 922, and the name of a user originating the ignition request 502.

The server 118 creates 1008 one or more encrypted ignition instructions consisting of less than all of the information contained in a corresponding ignition request.

An encrypted ignition instruction 504 is relayed 1010 to a vehicle 304 exclusively-associated with a single encrypted ignition instruction, and all ignition requests and encrypted ignition instructions are stored 1012 in persistent computer-readable memory.

Power is output 1014 from the waterproof case 102 to a vehicle starter in response to one or more of the hardware components decrypting and an encrypted ignition instruction, said output power starting the vehicle.

In various embodiments, the request 502 is parsed 1016 into the instruction 504 which is relayed 1018 to the vehicle 304. The vehicle 304 may decrypt 1020 the instruction 504, and the vehicle 304 may disable itself in response to expiration of a timestamp 922 or the vehicle traveling outside a predetermined geographic area.

Figure 11:
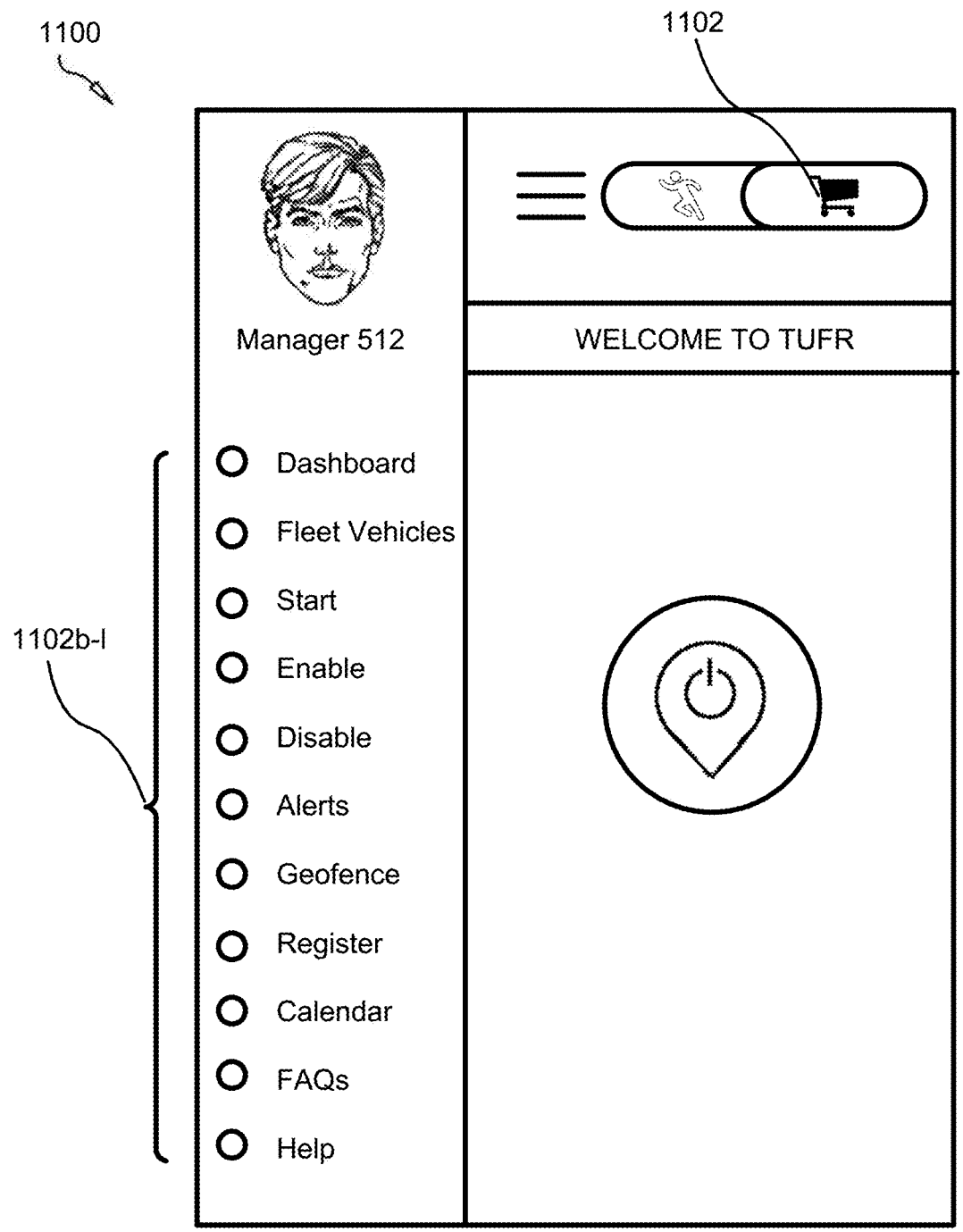
FIG. 11 illustrates an exemplary graphic user interface of a mobile phone application for remotely disabling and reenabling the starting and use of a vehicle in accordance with embodiments of the present invention.

FIG. 11 illustrates an exemplary graphic user interface 1100 of a mobile phone application 122 for remotely disabling and reenabling the starting of a vehicle 304 in accordance with embodiments of the present invention.

Various tactile controls 1102, or virtual controls 1102, position on the face of the interface 1100, each adapted to instruction the mobile phone application 122 to perform certain functions, including registering a vehicle using a registration module, seeing tables of vehicles 304 exclusively associated with a manager 512, starting a vehicle 304, disabling a vehicle 304, viewing itemized lists of alerts received from a vehicle including motion alerts, setting a map within which a vehicle 304 should be geofenced, registering a vehicle 304, and viewing a calendar of timeframes within which vehicles 304 may be active.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of remotely interrupting function of a vehicle, the steps of the method comprising:
   combining a plurality of hardware components into a housing, the plurality of hardware components including an electromechanical relay and a wireless module having a universally unique identifier (UUID), and service wires;
   installing the housing and wireless harness within the vehicle such that the relay is installed in an electrical control circuit (ECU) controlling one of: a vehicle starter, a throttle, and vehicle spark plugs;
   initiating an ignition request using a mobile software application on a data processing device (DPD) in logical communication with the relay via a WAN, the ignition request comprising: a unique identifier exclusively associated with the vehicle, GPS coordinates, and one or more enabling timestamps and one or disabling timestamps;
   creating one or more encrypted ignition instructions consisting of less than all of the information contained in a corresponding ignition request;
   relaying each encrypted ignition instruction to a vehicle exclusively-associated with a single encrypted ignition instruction;
   storing all ignition requests and encrypted ignition instructions in persistent computer-readable memory;
   energizing the relay in response to receiving an ignition request;
   geofencing the vehicle within a predetermined geographic area such that the vehicle is automatically disabled when the vehicle exits the predetermined geographic area; and
   starting the vehicle at a time indicated by an enabling timestamp in the ignition request;
   disabling the vehicle at a time indicated by a disabling timestamp in the ignition request.

2. The method of claim 1, wherein the relay is one of: normally open and normally closed.

3. The method of claim 1, wherein conductors forming the circuit are physically cut and the relay is spliced into the circuit.

4. The method of claim 1, further comprising installing a plurality of housing within the vehicle, each housing in a different ECU.

\* \* \* \* \*